United States Patent [19]

Murray

[11] 4,015,505
[45] Apr. 5, 1977

[54] ONE SIDED FASTENER DEVICE

[75] Inventor: Pierre Charles Murray, Elgin, Ill.

[73] Assignee: Illinois Tool Works Inc., Chicago, Ill.

[22] Filed: Feb. 23, 1976

[21] Appl. No.: 660,203

[52] U.S. Cl. .............................. 85/77; 85/1 JP
[51] Int. Cl.² ....................................... F16B 13/04
[58] Field of Search ............. 85/66, 73, 74, 75, 76, 85/77, 78, 79, 1 JP

[56] References Cited

UNITED STATES PATENTS

| 2,343,283 | 3/1944 | Davis | 85/75 |
| 2,403,330 | 7/1946 | Benton | 85/73 |
| 2,752,814 | 7/1956 | Iaia | 85/1 JP |
| 2,783,673 | 3/1957 | Lewis et al. | 85/75 |
| 2,971,425 | 2/1961 | Blakeley | 85/73 |
| 3,267,793 | 8/1966 | Devine et al. | 85/75 |
| 3,312,139 | 4/1967 | Cristina | 85/74 |

FOREIGN PATENTS OR APPLICATIONS

| 1,343,709 | 10/1963 | France | 85/75 |
| 999,794 | 10/1951 | France | 85/77 |
| 1,266,450 | 5/1961 | France | 85/74 |
| 106,954 | 11/1963 | Netherlands | 85/77 |
| 663,997 | 1/1952 | United Kingdom | 85/74 |
| 690,269 | 4/1953 | United Kingdom | 85/1 JP |

Primary Examiner—Roy D. Frazier
Assistant Examiner—Thomas J. Holko
Attorney, Agent, or Firm—Thomas W. Buckman; Robert W. Beart

[57] ABSTRACT

A one sided or blind fastener assembly including a threaded fastener member inserted through a sleeve member having a tubular body, a head at the outer end thereof and a tapered inner end, and an expansion member including an internally threaded end portion adapted to be expanded as it is drawn up over the sleeve. Longitudinally extending ribs on the tapered end portion of the sleeve matingly engage longitudinally extending slots in the expansion member serving to confine the movement of the expansion member to an axial telescopic movement over the tapered sleeve portion. The upper edges of the expansion member are tapered inwardly toward the slots to enhance the clamping capabilities of the fastener.

7 Claims, 9 Drawing Figures

ONE SIDED FASTENER DEVICE

BACKGROUND OF THE INVENTION

This invention relates generally to blind fastener members, generally of a three piece variety, and which are adapted to be inserted through an aperture in a workpiece and anchored therein with access to only one side of the workpiece. Such a fastener typically includes a threaded fastener having a shank and a head, a sleeve with a through bore and including a head at one end, and an expansion member designed to expand radially outwardly as it is pulled over the sleeve by the rotation of the threaded fastener.

Prior art devices of this general type are generally inadequate because of the lack of positive restraint of relative rotation between the expansion member and the sleeve. If the expansion member is permitted to rotate relative to the sleeve, then there will be no telescopic movement over the sleeve and thus eliminates effective expansion of the device on the blind side of the workpiece.

Prior art devices also typically are deficient in providing firm, distributed clamping pressure on the blind side of the workpieces. A distribution of the clamping forces is important in such a fastening technique to prevent the nut or expansion member from being pulled through the aperture under increasing clamping pressure.

Summary of the Invention

One of the objects of the invention is to provide a fastening device which can be inserted from one side of a workpiece and reliably clamped behind the workpiece without manipulation of the device from the clamping side.

Another object of the invention is to provide a blind fastener which reliably and effectively distributes the clamp load on the blind side about the periphery of the aperture in a workpiece.

Still a further object of the invention is to provide a blind fastener which reliably prevents the rotation of the expansion member relative to the sleeve over which it is to be expanded upon application of a rotary force to the threaded fastener member.

The above and other objects and advantages of the invention are achieved with a device of the type described wherein basic structural improvements include the provision of rib-like protuberances on a tapered inner end of a sleeve which are adapted to register with, and otherwise cooperate with, longitudinally extending slots in the expansion member. The sleeve includes a clamping head portion at the outer end and preferably is provided with surfaces enabling the sleeve to be grasped while a threaded fastener is rotated therein, causing the expansion member to move in a purely axial direction.

Other structural features contributing to the effectiveness of the blind fastener unit described herein include top edges of the expansion member which are inclined downwardly toward the point of intersection with the slot. This feature allows the clamping force of the expansion member to be distributed in line contact with the workpiece about the aperture therein. Additionally, the inner end of the sleeve may be formed to include a double tapered portion facilitating the interengagement of the expansion member with the sleeve.

BRIEF DESCRIPTION OF THE DRAWINGS

Other objects and advantages of the invention will become apparent upon reading the following detailed description and upon reference to the drawings in which.

DETAILED DESCRIPTION OF THE PREFERRED EMBODIMENT

Figure 1:
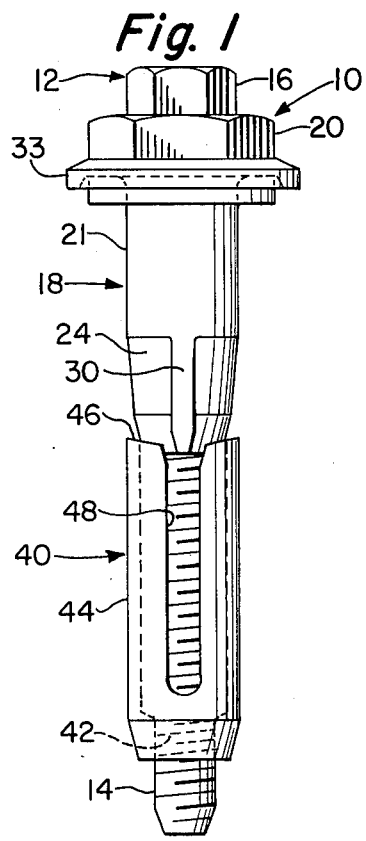
FIG. 1 is a side elevational view of the fastener assembly in condition for insertion through apertures in associated workpieces.

The fastener assembly 10 shown in FIG. 1 comprises a threaded fastener member 12 including a threaded shank 14 and an enlarged head 16 with rotation inducing surfaces, such as a hex configuration. Sleeve member 18 is positioned over the shank of the fastener in a telescopic manner and includes basically an enlarged head portion 20 at an outer end and a tapered inner end 22 with a generally cylindrical body portion 21 positioned intermediate the two ends. The tapered end portion includes diametrically opposed generally longitudinally extending ribs 30 for a purpose to be described later herein. The threaded fastener is of such a length that its extremity extends beyond the inner end of the sleeve enabling it to threadingly engage an expansion member 40. The expansion member will include an internally threaded end 42 and a generally tubular portion 44 located above the threaded end portion and adapted to engage the sleeve member.

Figure 3:
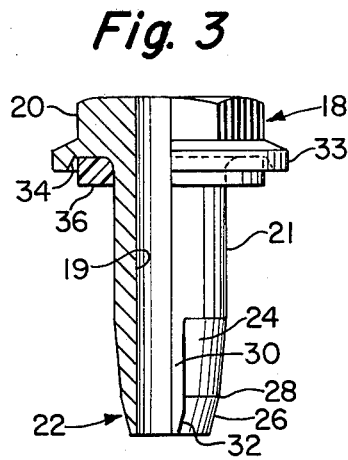
FIG. 3 is a partial elevational and partial axial sectional view of the sleeve member of the fastener assembly.
Figure 4:
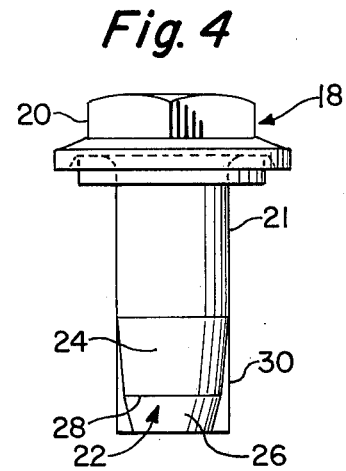
FIG. 4 is a side elevational view of the sleeve member taken at right angles to the view shown in FIG. 3.

Turning to FIGS. 3 and 4, the sleeve member 18 will be discussed in greater detail. A generally axially extending through bore 19 is formed in the sleeve with the diameter of the bore being sufficient to allow the threaded shank 14 to freely pass therethrough. The diameter should also be of such a size to prevent the head 16 of the fastener from passing through the sleeve, thereby providing an abutment surface adjacent the upper portion of the bore at the upper surface of the head 20. The workpiece clamping head 20 will preferably be provided with wrenching surfaces, typically of the hex variety, which enables the sleeve to be grasped with an appropriate tool to prevent its rotation about its axis as the threaded fastener is rotated into threading engagement with the expansion member. In the preferred embodiment, the head may be provided with an annular recess 34 beneath a washer base 33. The annular recess will be of such a size as to accommodate a resilient sealing washer 36. A body portion 21 terminates in a tapered region 22, which preferably is comprised of a pair of frustoconical sections 24 and 26. The lowermost section 26 is of a greater angle of taper than the uppermost section 24, thus creating a juncture line 28 between the two frustoconical sections.

A pair of diametrically opposed longitudinally extending rib portions 30 of a predetermined thickness or transverse dimension protrude from the tapered surfaces. These ribs 30 preferably present a radial dimension from the axis of the sleeve which is substantially constant throughout its length and generally equal to the radius of the cylindrical body so that they blend into the generally cylindrical body portion. The rib members may be chamfered as at 32 to facilitate their entry into the slots.

Figure 5:
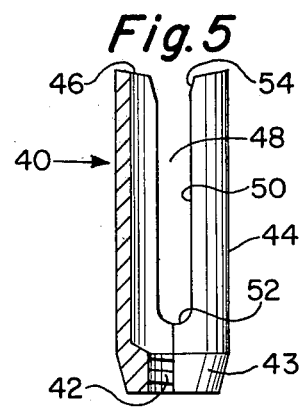
FIG. 5 is a partial elevational and partial axial sectional view of the expansion member of the assembly.
Figure 6:
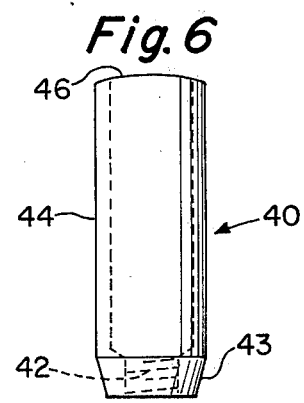
FIG. 6 is a side elevational view of the expansion member taken at right angles to the view shown in FIG. 5.
Figure 2:
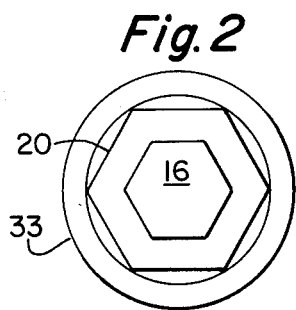
FIG. 2 is a top end view of the fastener assembly of FIG. 1.
Figure 7:
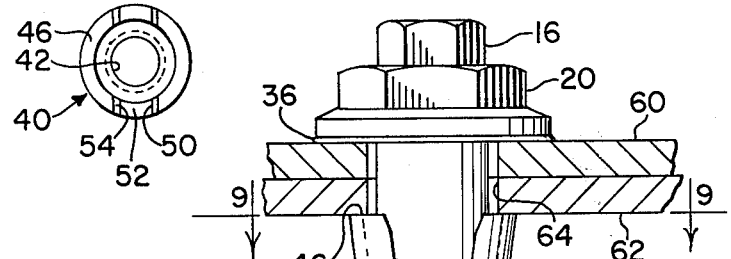
FIG. 7 is a top end view of the expansion member.

Turning to FIGS. 5 and 6, the expansion member 40 will also be discussed in greater detail. The lowermost extremity of the expansion member includes an internally threaded bore 42 for engagement with the threaded shank of the fastener 12. The uppermost tubular portion 44 is unthreaded and includes longitudinally extending slots 48 which form a pair of wing-like portions on either side thereof. The slots will be of a transverse dimension greater than the transverse dimension of the ribs 30 so that the ribs may register therein. The slots preferably extend the length of the tubular section and terminate in a radiused bottom portion 52 with the side edges 50 intersecting the upper edges 46 with a chamfer portion 54. The upper edges 46 advantageously lie in a plane which is inclined downwardly toward the slots. The purpose for such an uppermost edge configuration will be apparent hereinafter relative to the operation of the fastener assembly.

Figure 8:
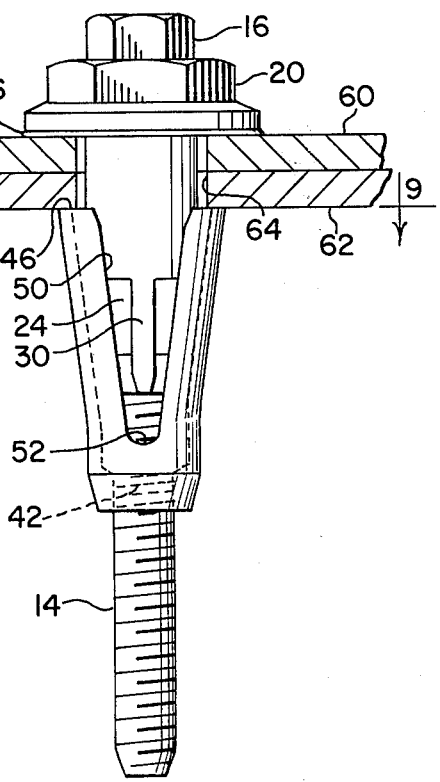
FIG. 8 is an elevational view of the assembly showing the clamping of the blind side of the workpieces by the expansion member.
Figure 9:
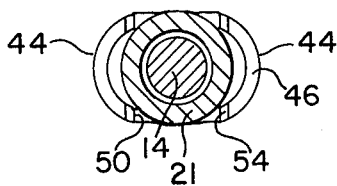
FIG. 9 is a sectional view taken along the line 9—9 of FIG. 8.

In use, the assembly 10 is inserted through aligned apertures 64 in a pair of overlapping workpieces 60 and 62 such as those shown in FIG. 8. To maximize the shear strength of the fastener, the diameter of the body 21 adjacent the head is slightly less, but still substantially equal to the diameter of the aperture 64. The diameter of the expansion member 40 should also be substantially that of the diameter of the cylindrical portion 21 of the sleeve. The assembly shown in FIG. 1 is inserted through the aperture 64 to the point where the clamping surface of the head 20 or the sealing washer 36 is abutting the uppermost portion of the workpiece 60. The insertion of the assembly may be facilitated by providing the expansion member with a tapered entering end portion 42. Clamping action is initiated by rotating the fastener member 12 about its axis while the sleeve is retained from rotation by engaging the head 20 with suitable tools.

The transition ring or juncture line 28 between upper frustoconical section 24 and lower frustoconical section 26 presents a diameter greater than the inner diameter of the tubular portion of the expansion member. The diameter at the free extremity of lower section 26 is less than the diameter of the tubular portion of the expansion member thus facilitating the telescopic association of expansion member with the sleeve and allowing a positive key-like interaction between the ribs and slots prior to the application of wedging forces to the sleeve. The juncture line 28 is the region which the tubular wing-like portion 44 contacts, forcing them to expand radially to the position shown in FIG. 8. Since the ribs extend upwardly onto the shallow tapered section 24, they will serve as a positive stop in the slots preventing rotation of member 40 in the region of wedging contact without requiring the ribs to protrude from the body portion 21.

The expansion member will continue to be pulled upwardly, expanding outwardly until it reaches a clamping engagement with the lowermost workpiece 62. It is at this point that the benefits of the inclined edges 46 become apparent. The inclination of these edges allows the clamping engagement beneath the workpiece to be a line contact about the periphery of the hole. Whereas, if the edges were not so inclined, the clamping engagement would be merely point contact between the corner forming the intersection of the top edge with the slot and the workpiece. Such a concentration of force under great clamping pressures could serve to tear or otherwise rupture the aperture allowing the entire assembly to be pulled out.

Turning again to FIG. 3, the use of a chamfered interconnection 54 between the top edge 46 and the side edges 50 of the slot becomes an important feature during the initial engagement of the lower surface of the workpiece. A sharp substantially 90° juncture between top edges 46 and slot edges 50 could prevent complete expansion of the member since such a sharp edge would tend to bite into the undersurface of the workpiece 62, preventing the member to assume its full expanded and clamping condition as shown in FIG. 8.

It has been found preferably to construct the tubular wing-like portions of a length which is great relative to the length of the threaded region 42 and thus providing substantial column strength to the clamping member. The radius 52 at the bottom of the slot allows the wing-like members to separate without fear of fracture at the bottommost region of the slot. With the line contact provided by the inclined edges 46, the amount of radial expansion of the member 40 can be minimized thus taking advantage of the column strength.

While the body 21 has been described as being cylindrical, it should be understood that other configurations can be utilized and still come within the scope of the invention. For example body 21 could be configured to include a noncircular cross section which could cooperate with an aperture to prevent rotation of the sleeve while the device is expanded in the manner described herein.

Thus it is apparent that there has been provided in accordance with the invention, a blind one-sided fastener that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. A blind fastener assembly for clamping a plurality of complementary plate-like workpieces together with access from only one side thereof, comprising a threaded fastener member with a radially enlarged driving head including rotation inducing surfaces, a sleeve member comprising a tubular body with a head provided with means to resist rotation when said sleeve is mounted in a complementary workpiece at an outer end thereof and a gradually tapered portion at its distal end, the tapered portion of said sleeve comprising two frustoconical sections of different and successively greater angles of taper from the body to the distal extremity of said sleeve, the body of the sleeve member being generally cylindrical of a predetermined diameter substantially equal to the diameter of apertures formed in the complementary workpieces, the threaded fastener member extending through the sleeve so that the distal end of the fastener projects beyond the distal end of the sleeve, the tapered portion including rib means formed thereon and extending generally longitudinally thereof to the free extremity of the sleeve, an expansion member including an internally threaded first end portion threadingly engaging the distal end of the fastener and a workpiece clamping second end portion, said second end portion being generally tubular with an outer diameter substantially equal to the predetermined diameter of the sleeve body and an inner diameter greater than the diameter at the free extremity of the tapered section but less than the diameter at the juncture of the two frustoconical sections, generally longitudinally extending slot means extending through the second end portion toward the first end portion, the slot means forming a pair of wing-like tubular segments adapted to be deflected radially outwardly as the expansion member is pulled upwardly over the tapered section of the sleeve as a result of rotation of the screw relative to the expansion member, the slot and rib means coacting to prevent relative rotation between the expansion member and sleeve member, the uppermost edge of each wing-like tubular segment being convex toward the head of the sleeve thereby lying in a plane inclined downwardly toward the slot when the expansion member is in an unexpanded condition but adapted to lie in a plane substantially perpendicular to the axis of the fastener assembly when expanded to clamp the bottommost plate with line contact.

2. The fastener assembly of claim 1, wherein the rib means extends a predetermined radial extent from the central axis of the sleeve and said radial extent being substantially equal to the radius of the cylindrical body of the sleeve.

3. The fastener assembly of claim 1, wherein the uppermost extremity of the slot includes a chamfered region interconnecting the side edges of the slot with the top edges of the wing-like segments.

4. The fastener assembly of claim 1, wherein the rib means is chamfered to a reduced thickness at the extremity adjacent the inner end of the sleeve.

5. The fastener assembly of claim 1, wherein the first end portion of the expansion member is of a reduced outer diameter relative to the diameter of second end portion and intermediate portion.

6. The fastener assembly of claim 1, wherein the slot means terminates adjacent the internally threaded first end portion with a radiused base portion.

7. The fastener assembly of claim 1, wherein an annular recess is formed beneath the head of the sleeve member and a compressible sealing washer positioned therein.

* * * * *